May 3, 1927.
F. T. BAIRD
1,627,264
ELECTRIC LANTERN BATTERY
Filed Sept. 4, 1923
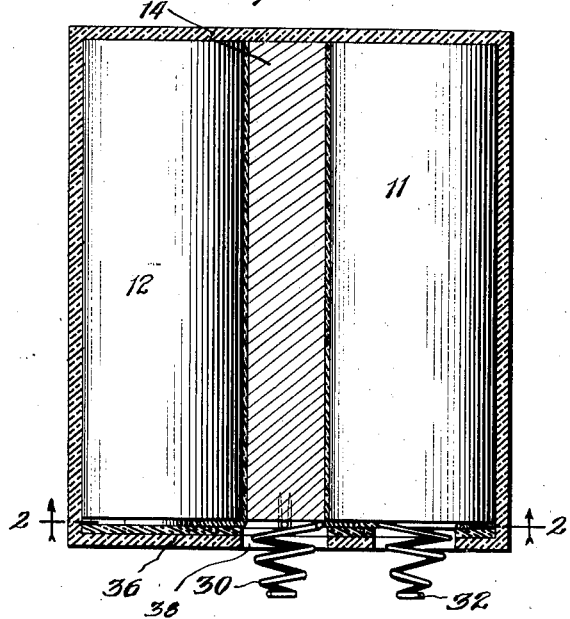
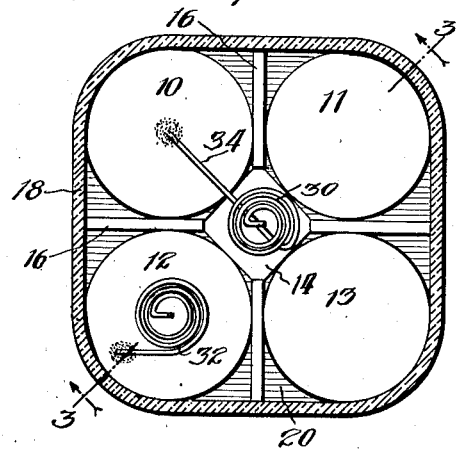
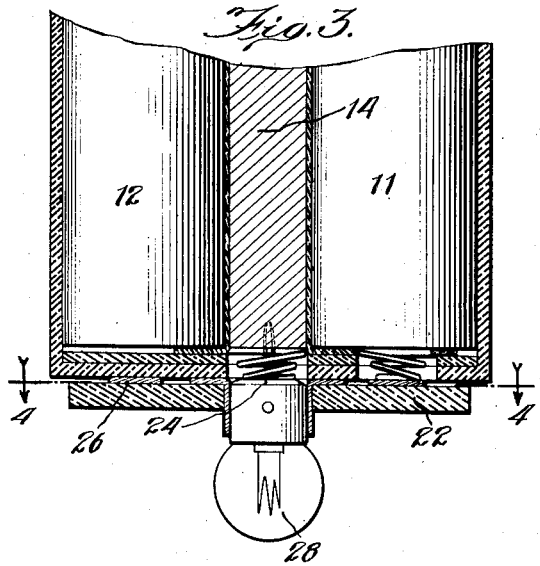
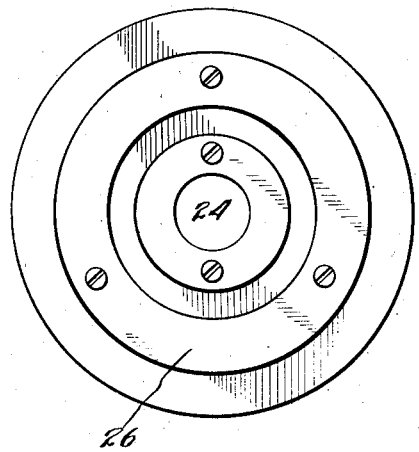
Inventor:
Frank T. Baird
By Cheever & Cox
Attys.

Patented May 3, 1927.

1,627,264

UNITED STATES PATENT OFFICE.

FRANK T. BAIRD, OF BLUE ISLAND, ILLINOIS, ASSIGNOR TO FRENCH BATTERY & CARBON COMPANY, OF MADISON, WISCONSIN, A CORPORATION OF WISCONSIN.

ELECTRIC-LANTERN BATTERY.

Application filed September 4, 1923. Serial No. 660,680.

On railroads, trainmen's long used kerosine lanterns have been largely replaced by electric lanterns having immediately below the pivoted handle a case, adapted to removably receive a comparatively large dry battery, usually of several cells, carrying on its bottom electric terminals adapted to automatically interfit with similar terminals in the bottom of the case, connected with a lamp, suitably disposed in the lantern structure, usually but not necessarily immediately below the bottom of the battery case. As operating conditions require the battery to be loose enough in the case for instant removal on opening the case, serious difficulties have heretofore arisen in securing a battery, equipped with terminals of such a character as to insure positive operation of the lantern under all usual working conditions. Again, batteries of this class made up of several cells are subjected to very hard usage in lantern swinging and still more in shipment in quantity, tending to disrupt the cell assembly and consequently the positions of its terminals with the result that if the battery is not internally injured, its terminals will not automatically interfit with the lantern terminals with the result that operation of the complete lantern is impaired or destroyed.

The objects of this invention are to construct a multiple cell battery for the described use which is, for practical purposes, perfectly rigid and to equip that battery or any other for lantern use with electric terminals which for practical purposes never fail to operate in the conditions named.

The invention consists in means, one of which will be hereafter described, capable of attaining the foregoing objects, which can be easily and cheaply constructed, which is satisfactory in operation and is not readily liable to get out of order. The invention further consists in features and details of construction which will be hereafter more fully set forth in the specification and claims.

Referring to the drawings in which like numerals designate the same parts throughout the several views:

Figure 1 is a central, vertical section of a battery illustrating this invention in its preferred form, the same being separated from any lantern.

Figure 2 is an inverted plan sectional view on the line 2—2 of Figure 1.

Figure 3 shows the bottom portion of a battery of Figure 1 in assembly with a conventional lantern case bottom and the lamp carried thereby.

Figure 4 is a plan view of the lantern terminals on the line 4—4 of Figure 3.

The particular battery here shown includes four conventional dry cells 10, 11, 12, 13, arranged parallel to each other around a central rigid post 14, usually of wood, and of substantially the length of each cell. The cells are separated by insulating boards or strips 16 and enclosed in a tightly fitting outer case 18 of general rectangular form. In practice, the remaining spaces inside the case are conventionally filled with insulating compound 20 which hardens and makes the entire battery mechanically one solid block which will, due to the presence of the central, solid post 14 of the length of the cells, stand any amount of side or rotary crushing action with the result that in commerce, the conventional electric connections, not shown, between the various cells are not disturbed and consequently the battery unit is, within its normal life, always ready for work.

When a battery of this general type is applied inside a lantern battery case whose bottom 22 is equipped with a lamp or other center terminal 24 for engagement with one pole of the battery and a concentric ring terminal 26, connected to the outer terminal of lamp 28 for engagement with the other terminal of the battery, it is necessary that the battery be equipped with two corresponding terminals 30 and 32 of such a character that they will, within reasonable limits, always insure proper contact at the points named, no matter how much the complete battery may move up and down or rotate on its own axis in the lantern case above its base 22. In this invention, the desired result is attained by making these terminals 30 and 32, the former conventionally attached by wire 34 to battery 10, and rigid on post 14, the latter electrically connected and mechanically attached to the cell 12, coil springs which as shown in Figure 1 are capable, when released, of springing out a substantial distance from the battery toward the lantern contacts 24 and 26 and which are, as shown in Figure 3, capable of a large measure of collapsement while still maintaining good contact. This is of importance when the vertical space for the battery in the lantern case is comparatively limited.

In the construction shown, the terminals 30 and 32 are at the bottom of the battery so that its weight holds them as shown in Figure 3.

One important point is that by the use of the spring contacts 30 or 32, the bottom 36 of the battery case can be provided with large perforations 38 through which the springs freely pass, with the result that if the case bottom 36 becomes wet, the moisture does not reach the contacts thereby creating a short circuit and thus injuring or destroying the battery.

The casing 18 may be of any suitable material and of any desired form. Preferably, a pasteboard container is employed. The central post 14 and the dividing strips 16 constitute an interior nest, or cell-structure, which fits snugly within the container. As illustrated, it is unnecessary to encase the cells in individual cartons. That is, the zinc cans, or cup-shaped negative electrodes, may be introduced without the use of wrappings thereon. In the illustrations given, the cell 10 is shown with its sealed end down, and the wire 34 is soldered to the cap on the carbon or positive electrode, as indicated at $10^a$. Also, the wire of the coil-spring contact 32 is shown soldered to the bottom of a zinc cup $12^a$, as indicated at $12^b$.

Any suitable arrangement of the cells may be made. That is, the cells may be inverted, or some of them may be inverted, or they may have their sealed ends up, as desired. In the illustration given, only one of the cells has its carbon pole presented downwardly. As indicated above, however, the cells are assumed to be suitably connected in series, the connections at the upper ends of the cells not being illustrated.

The central spring-coil contact 30 is, in Fig. 3, assumed to be in contact with the central terminal of the lamp 28. On the other hand, the outer terminal of the lamp is shown fitted in a socket which is assumed to be in electrical contact with the annular contact member 26 with which the eccentrically placed spring-coil contact 32 is in engagement. The coil-spring contacts 30 and 32 are under a compression in the condition illustrated in Fig. 3. In practice, the battery is likely to be of less height than the lantern-casing; hence when the lantern is swung in a circle by a brakeman, there is a tendency of the battery to shift longitudinally in the lantern-casing. Also, there may be a tendency for the battery to rotate on its own axis in the lantern-casing. Inasmuch as the contact 26 is of annular form and the spring contact 30 centrally located, it is of no consequence as to just how the battery is inserted in the lantern-casing, or whether the battery may shift somewhat about its axis within the lantern-casing. Ordinarily, the casing in railway electric lanterns of the type referred to above has a removable top.

In loading the lantern, the battery is inserted through the top of the casing and is then confined between the top of the lantern-casing and the bottom of the lantern-casing. However, lantern-casings are manufactured by various companies, and there is apt to be variation in the height of the lantern-casing. For this reason, and for other reasons stated, the coil-spring contacts are particularly useful in connection with these lanterns, as these contacts will serve always to maintain contact between the terminal cells of the battery and the contacts in the bottom of the lantern-casing. Contacts 30 and 32 are permanently connected with the battery, one of the contacts preferably having its upper end abutting against a central supporting member, such as the lower end of the post 14, and the other having its upper end abutting against the zinc can of a cell. Inasmuch as the battery unit is strong and compact and the cells are incapable of shifting within the container 18 of the battery, it will be understood that yielding pressure always is exerted between the battery and the bottom of the lantern-casing, and the contact between the coil-spring contacts of the battery and the co-acting contacts of the lantern-casing always is securely maintained, regardless of the swinging and jarring actions to which the lantern is subjected in practice.

The foregoing detailed description has been given for clearness of understanding only, and no unnecessary limitations should be understood therefrom.

Having thus described my invention, what I claim as new and desire to secure by Letters Patent is:

1. The combination with a lantern-casing having at its bottom an internal annular contact, of a battery-unit comprising a container having side walls, a top wall and a bottom wall, the bottom wall of said container having a central perforation and an eccentric perforation, dry-cells confined in said container and insulated from each other, and coil-spring contacts having their upper ends permanently attached to said battery-unit and electrically connected with electrodes of said cells, said coil-spring contacts protruding through said perforations and one of said contacts engaging said annular contact member.

2. The combination with a lantern casing having at its bottom an internal annular contact, of a battery unit comprising a container whose bottom wall is provided with an eccentric perforation, dry cells in said container, one of said dry-cells having a negative cup-shaped electrode provided with an exposed bottom wall, and a coil-spring contact soldered to said exposed bottom wall and confined under compression between the same and said annular contact.

In witness whereof, I have hereunto subscribed my name.

FRANK T. BAIRD.